US012785348B2

(12) United States Patent
Hugonnot et al.

(10) Patent No.: US 12,785,348 B2
(45) Date of Patent: Nov. 3, 2026

(54) MAMYSHEV LASER OSCILLATOR FOR GENERATING ULTRA-SHORT PULSES AND DEVICE FOR STARTING SAME

(71) Applicant: COMMISSARIAT A L'ENERGIE ATOMIQUE ET AUX ENERGIES ALTERNATIVES, Paris (FR)

(72) Inventors: Emmanuel Hugonnot, Le Barp Cedex (FR); Etienne Poeydebat, Le Barp Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 408 days.

(21) Appl. No.: 18/564,030

(22) PCT Filed: May 23, 2022

(86) PCT No.: PCT/FR2022/050974
§ 371 (c)(1),
(2) Date: Nov. 24, 2023

(87) PCT Pub. No.: WO2022/248801
PCT Pub. Date: Dec. 1, 2022

(65) Prior Publication Data

US 2024/0291223 A1 Aug. 29, 2024

(30) Foreign Application Priority Data

May 27, 2021 (FR) ...................................... 21 05538

(51) Int. Cl.
*H01S 3/067* (2006.01)
*H01S 3/08022* (2023.01)
*H01S 3/1112* (2023.01)

(52) U.S. Cl.
CPC ........ *H01S 3/06791* (2013.01); *H01S 3/0675* (2013.01); *H01S 3/08027* (2013.01); *H01S 3/1112* (2013.01)

(58) Field of Classification Search
CPC .. H01S 3/1112; H01S 3/06791; H01S 3/0675; H01S 3/08027
See application file for complete search history.

(56) References Cited

U.S. PATENT DOCUMENTS

2004/0037494 A1* 2/2004 Kanou ................ H01S 3/06791 385/27
2017/0365972 A1* 12/2017 Samartsev ............. H01S 3/136
(Continued)

FOREIGN PATENT DOCUMENTS

CN 109698458 A * 4/2019 ................ H01S 3/11
CN 210926601 U 7/2020
(Continued)

OTHER PUBLICATIONS

International Search Report & Written Opinion issued Sep. 30, 2022 in PCT/FR2022/050974, filed on May 23, 2022, 18 pages.
(Continued)

*Primary Examiner* — James A Menefee
(74) *Attorney, Agent, or Firm* — Oblon, McClelland, Maier & Neustadt, L.L.P.

(57) ABSTRACT

A laser device including a first cavity forming a Mamyshev oscillator, comprising a bandpass first filter at the first wavelength, and a second filter that also transmits the wavelength but that is reflective at a second wavelength, a second cavity, containing the first cavity, for forming a continuous-wave laser beam at the first wavelength and/or at a third wavelength neighbouring the first wavelength, the separation between the first and third wavelengths being smaller than the spectral width of the first filter and of the second filter, and means for allowing or interrupting a
(Continued)

continuous-wave oscillation at the first wavelength or at said neighbouring wavelength, in the second cavity.

12 Claims, 4 Drawing Sheets

(56) References Cited

U.S. PATENT DOCUMENTS

| | | | | |
|---|---|---|---|---|
| 2019/0305516 | A1 | 10/2019 | Wise et al. | |
| 2023/0163553 | A1 * | 5/2023 | Boulanger | H01S 3/06791 372/6 |

FOREIGN PATENT DOCUMENTS

| | | | | | |
|---|---|---|---|---|---|
| CN | 111711058 | A | * | 9/2020 | H01S 3/094003 |
| CN | 111786252 | A | * | 10/2020 | H01S 3/1106 |

OTHER PUBLICATIONS

Liu et al. "20 MW Mamyshev Oscillator featuring LMA-PCF", *2019 Conference On Lasers and Electro-Optics* (*Cleo*), OSA, May 5, 2019, pp. 1-2.

Poeydebat et al. "All-fiber Mamyshev oscillator with high average power and harmonic mode-locking", Optics Letters, vol. 45, No. 6, Mar. 15, 2020, pp. 1395-1398.

* cited by examiner

MAMYSHEV LASER OSCILLATOR FOR GENERATING ULTRA-SHORT PULSES AND DEVICE FOR STARTING SAME

TECHNICAL FIELD

The invention pertains to the field of laser systems delivering ultra-short pulses, and more particularly to "Mamyshev" passive Mode-Locking (ML) fibre oscillators. The latter are particularly attractive because they have noteworthy performances (energies of several tens of nJ, extremely short pulse durations <50 fs) while being simple to produce (few components).

Nevertheless, a defect of these system is that it is difficult or even impossible to start them. The proposed invention makes it possible to remedy this problem by proposing a simple and robust system for starting a "Mamyshev" passive Mode-Locking fibre oscillator.

Such an oscillator is based on the concatenation of two Mamyshev regenerators.

The operating principle of a Mamyshev regenerator is as follows: a pulse propagating in an optical fibre is subjected to the Self-Phase Modulation (SPM) phenomenon, inducing a spectral broadening. A bandpass spectral filter, of central wavelength sufficiently offset in relation to the wavelength of the initial pulse, then makes it possible to only allow the portion of the spectrum generated by SPM to pass through. Thus, the mechanism acts as a saturable absorber. Only the pulses intense enough to produce the sufficient spectral offset can be transmitted. The insufficiently intense pulses are blocked.

The Mamyshev oscillator implements this principle. As illustrated in FIG. 1 (based on the article by E. Poeydebat et al. entitled "All-fiber Mamyshev oscillator with high average power and harmonic mode-locking", Vol. 45, No. 6/15 Mar. 2020/Optics Letters, p. 1395-1398), the laser cavity of a Mamyshev oscillator 10 in a ring comprises two amplifiers 2, 4, an output coupler 8 and two bandpass filters 6, 12 between the amplifiers. By sufficiently offsetting the filters, only pulses sufficiently intense for overcoming by SPM the separation between the two filters may propagate into the cavity. Designed to operate in a significantly non-linear operating condition, such a system thus gives access to extremely high intensity levels, as explained in particular in the article by E. Poeydebat et al. mentioned above. Acting as an ultrafast saturable absorber, the mechanism may give rise to ultra-short pulses, below 50 fs.

The modulation depth of the virtual saturable absorber, and consequently, the operating condition and the possibility of starting a Mamyshev oscillator, depend highly on the spectral separation between the filters (typically of Gaussian or near Gaussian shapes) in relation to their spectral width.

When the spectral separation between filters is equivalent to their mid-height widths, a strong superposition of the spectra transmitted is obtained, which corresponds to a small modulation depth. The systems may then be self-starting, but they deliver strongly modulated spectra with small spectral widths (only a few nm or less, see in particular the article by N. Tarasov et al., "Mode-locking via dissipative Faraday instability", Nat. Commun. 7, 12441 (2016)).

When the spectral separation between the filters is slightly greater, more or less equal to their base width, namely typically twice the mid-height width, the spectral superposition at the base of the filters is still sufficient so that a CW lasing is possible and the system can start by itself. Generating fluctuations by modulating the pump diodes of the amplifiers (typically a few tens of kHz for a few tens of microseconds) makes it possible to help start the system, but the separation between the filters is then fixed by the CW lasing threshold which limits the modulation depth and therefore the performances of the system (spectral width, instabilities of the mode-locking).

When the separation between the filters is much greater (typically several times the width of the filters), there is no longer any spectral superposition of the filters and very large modulation depths are obtained. It is in this case that extremely wide spectra (up to ~100 nm), corresponding to ultra-short pulses (<50 fs) are obtained. On the other hand, the spectral separation is then such that the CW lasing becomes absolutely impossible and the system can no longer start from only fluctuations of the noise or even by modulating the pump diodes. It is then vital to use additional means to start it. In this case, the most used solutions for starting are then either to inject a sufficiently intense initial pulse from an external source, or add an additional arm, specific to the starting and which bypasses the first filter, including a saturable absorber or a non-linear rotation type mechanism of the polarisation. Once starting has been carried out and the ML operating condition has been reached, the starting source can be stopped. The interest of these solutions is moderated because they need to use a secondary laser source delivering short pulses (either an external laser or an additional arm) considerably limiting the practical interest of such systems.

A more satisfactory solution that does not require an external source while offering the advantage of providing a large modulation depth is for one of the two spectral filters to be a tunable spectral filter. Thus, the filter may firstly be placed close to the other filter, so as to initiate a CW lasing, afterwards the pump diodes are modulated in order to generate instabilities and, finally, the filters are separated once the mode-locking has been obtained. The main drawback of this solution is that maintaining the mode-locking is only carried out by progressively adjusting the pump power at the same time as the filters are separated, which requires either a complex and random manual procedure or the use of expensive motorised components controlled by a path search algorithm.

Currently, there are no systems for obtaining ultra-short pulses controlled by the separation between the spectral filters in a simple, robust, reproducible and inexpensive way.

The invention makes it possible to resolve this problem by proposing a Mamyshev oscillator that may comprise a large modulation depth (spectral separation between the filters of several times the width of the filters), which can be started without a short-pulse secondary source (external laser or additional arm), that is easy to implement (without complex starting procedure), robust (entirely fibre) and inexpensive (no tunable spectral filters).

DISCLOSURE OF THE INVENTION

The invention firstly relates to a laser device comprising:

a first cavity forming a Mamyshev oscillator comprising a bandpass first filter at a first wavelength ($\lambda_1$), and a second filter that also transmits the wavelength ($\lambda_1$), but that is reflective at a second wavelength ($\lambda_2$), a second cavity, containing the first cavity, for forming a continuous-wave laser beam at the first wavelength ($\lambda_1$) and/or at a third wavelength ($\lambda_3$) neighbouring the first wavelength ($\lambda_1$), the separation between $\lambda_3$ and $\lambda_1$ being smaller than the spectral width of the first filter and of the second filter, means for allowing or interrupting a continuous-wave oscillation at the wavelength ($\lambda_1$) or at said neighbouring wavelength ($\lambda_3$), in the second cavity.

In other words, according to the invention, the laser device comprises a first cavity forming a Mamyshev oscillator comprising a 1st filter at the wavelength ($\lambda_1$), a second filter, reflective at the wavelength ($\lambda_2$) but transmitting at the wavelength ($\lambda_1$), and a second cavity, containing the first, for forming a continuous-wave laser beam at the wavelength ($\lambda_1$) or at a neighbouring wavelength ($\lambda_3$) of $\lambda_1$ and means for allowing or interrupting an oscillation at the wavelength ($\lambda_1$) or at the neighbouring wavelength, in said second cavity.

According to the invention, a system is therefore produced comprising a first cavity and a second cavity, the first cavity being interlocked in the second cavity, the second cavity being for starting and making it possible to obtain a continuous-wave (CW) lasing, and the first cavity being for the ML operation, the starting of the ML laser being based on fluctuations of the lasing (CW); after starting the ML laser, the continuous-wave lasing (CW) is inhibited.

Therefore, the invention differs from the usual techniques implemented for starting a Mamyshev oscillator with large modulation depth (with non superposition of the filters), since in general a short-pulse external source, an additional arm including a physical or virtual saturable absorber, or a motorised tunable filter are used.

The separation between the wavelengths $\lambda_1$ and $\lambda_2$ is for example between 5 nm and 25 nm.

The second filter may be disposed downstream of an optical circulator.

The second cavity may be delimited by a mirror, for example a fibre mirror or by a fibre Bragg mirror.

The means for allowing or interrupting the oscillation of the wavelength ($\lambda_1$), in the second cavity, comprise for example an optical switch or a variable optical attenuator. According to a particular embodiment, the second filter comprises a Bragg grating mirror.

The first filter may for example comprise a transmission filter or an optical circulator and a reflection filter.

In a laser device according to the invention, the first cavity may be in a ring or be a linear cavity.

The invention also relates to a method for starting a laser device such as described above or in the present description, comprising:

- generating, in the second cavity, a continuous-wave laser beam at the wavelength ($\lambda_1$);
- generating, in the first cavity, a pulsed laser beam at the wavelength ($\lambda_2$) and at the wavelength ($\lambda_1$),
- stopping the continuous-wave laser beam.

According to a particular embodiment, the losses or the gain at the first wavelength ($\lambda_1$) may be modulated during the starting period.

The first cavity comprises for example 2 fibre amplifiers each pumped by a laser diode, the method further comprising modulating the beam of these diodes.

DETAILED DISCLOSURE OF PARTICULAR EMBODIMENTS

Figure 2:
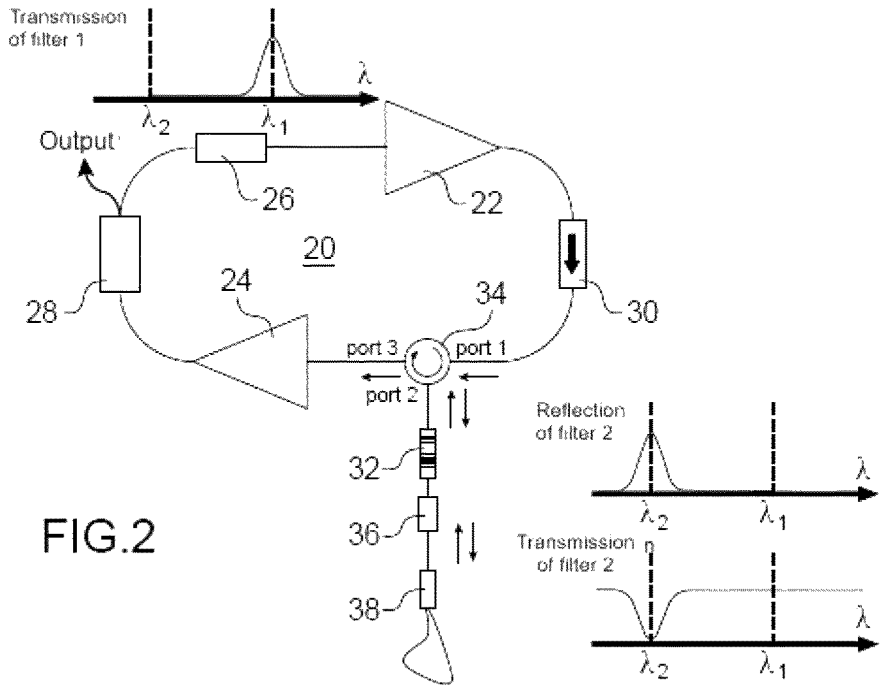
FIG. 2 shows an example of embodiment of a Mamyshev oscillator according to the invention.

FIG. 2 shows an example of embodiment of a Mamyshev oscillator according to the invention.

In this example, a 1$^{st}$ cavity 20, here in a ring, of length for example less than 30 metres, comprises two amplifiers 22, 24, which may in particular be fibre amplifiers, for example doped with ytterbium (with a "small signal" gain that may be between 20 dB and 30 dB). Examples of such amplifiers are given in the article by E. Poeydebat et al. entitled "All-fiber Mamyshev oscillator with high average power and harmonic mode-locking", Vol. 45, No. 6/15 Mar. 2020/Optics Letters, p. 1395-1398. Each amplifier comprises pumping means, for example a diode at 976 nm.

The cavity 20 further comprising a first spectral filter 26, for example a Gaussian filter, which allows radiation to pass through in a centred spectral bandwidth at a wavelength $\lambda_1$, for example of width 1 nm. It may be centred in a band that corresponds to the emission of amplifier fibres, for example the ytterbium band.

It further comprises an output coupler 28, which makes it possible to extract the output beam of the cavity.

It may comprise an isolator 30, which ensures a unidirectional propagation.

The system also comprises a second spectral filter 32, for example a Gaussian filter, centred at a wavelength $\lambda_2$, for example of width 1 nm. It may be centred in a band that corresponds to the emission of amplifier fibres, for example the ytterbium band. This filter 32 is preferably a reflection filter (for example of the Bragg grating mirror type): it reflects any radiation at the wavelength $\lambda_2$ and sends it back into the 1$^{st}$ cavity 20. The first filter 26 does not allow any radiation, or very little radiation, to pass through at the wavelength $\lambda_2$.

This second filter 32 is disposed, in relation to the ring, behind an optical circulator 34 and upstream of an optical switch 36 making it possible to block the passage of the beam. Finally, the cavity is completed by a mirror 38, for example a fibre mirror, for example again a 2 by 2 fibre coupler looped back on itself.

The separation between the central wavelengths $\lambda_1$ and $\lambda_2$ of the filters 26, 32 is preferably greater than n times (for example: n=4) the width of the individual filters, this separation is for example between 5 nm and 15 nm (or even 25 nm), which makes it possible to avoid a superposition of the optical spectra defined by these filters.

As the transmission profile of a Bragg mirror is opposite to its reflection profile, the filter 32 allows the non-reflected wavelengths to pass through, and in particular any radiation at the wavelength $\lambda_1$.

Figure 1:
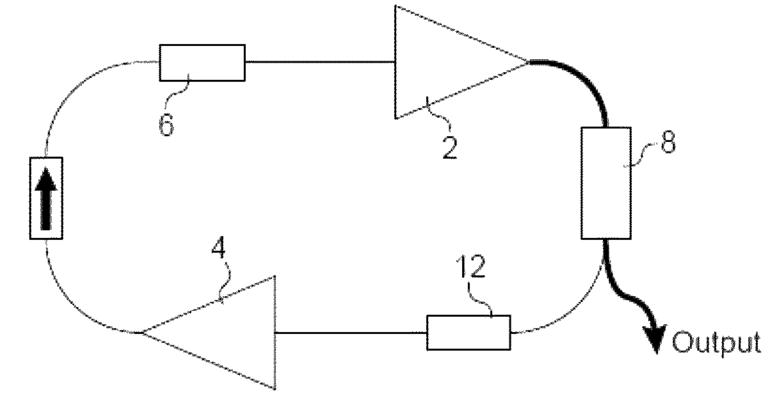
FIG. 1 shows a known Mamyshev oscillator.

Thus, the device of FIG. 2 comprises two interlocked cavities:

- the first cavity is defined by the reflection on the filter 32; it is equivalent to a Mamyshev oscillator such as illustrated in FIG. 1;
- the second cavity, which comprises the first cavity but also a linear portion, is defined by the reflection on the mirror 38, which reflects all of the wavelengths that reach it, in particular the radiation at the wavelength $\lambda_1$.

The operation of this system is as follows.

When the amplifiers 22, 24 are switched on and the optical switch 36 closed (rendered conducting), and the gain of the amplifiers is greater than the total losses in the second cavity (this latter condition is obtained by the oscillations in the cavity), the laser starts on the fluctuations of the noise in free multimode.

A multimode continuous-wave beam, having intensity fluctuations, is emitted at a central wavelength $\lambda_1$ defined by the filter 26. The high intensity spikes, sufficiently intense to cross, by Self-Phase Modulation (SPM), the separation between the filters 26 and 32, are then reflected by the filter 32 and can oscillate in the first cavity.

A train of short pulses is emitted as output.

Therefore, this gives an operation of a Mamyshev oscillator with a virtual saturable absorber of large modulation depth. Once the Mode-Locking (ML) operation has been obtained, the optical switch 36 may then be opened (rendered non-conducting) in order to inhibit the CW operation of the second cavity. The laser then emits a radiation that includes the wavelengths $\lambda_1$ and $\lambda_2$.

Figure 3:
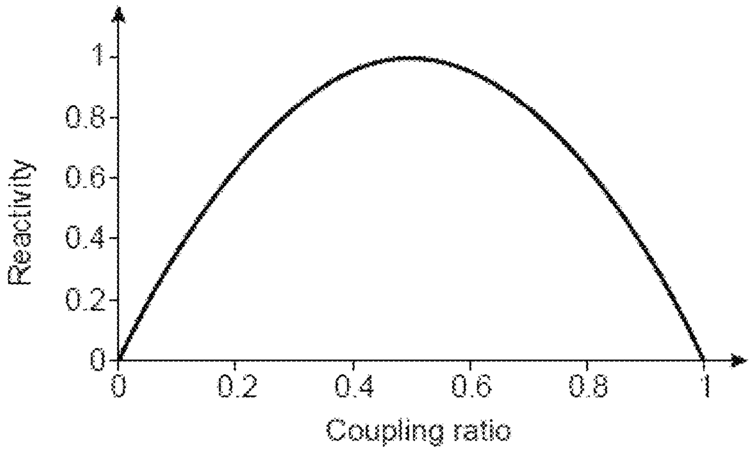
FIG. 3 shows a reflectivity curve of the fibre mirror depending on the coupling ratio of the fibre coupler.

In order to avoid the continuous-wave (CW) lasing from being too dominant and inhibiting the possibility of obtaining a ML lasing, the reflectivity of the fibre mirror 38 is preferably adjusted so that the two operations have average powers of the same magnitude (typically a few hundreds of mW in this example). This reflectivity of the fibre mirror 38 may be adjusted between 0% and 100% according to the coupling ratio of the fibre coupler used, as illustrated in FIG. 3. The coupling ratio may be modified by changing coupler.

It is also possible to replace the optical switch 36 with a variable optical attenuator, which makes it possible not only to accurately adjust the power reflected by the fibre mirror 38 in continuous-wave (CW) operation but also to inhibit the CW lasing in ML operation (by attenuating such that the total losses of the second cavity are greater than the gain of the amplifiers).

If the natural fluctuations of the CW laser are insufficient to trigger the ML operation, it is possible to modulate the pump diodes of the amplifiers 22, 24 to generate greater fluctuations. According to one embodiment, a function generator is used that controls the supply of the pump diodes. For example, it concerns a generator from Keysight, for example the Keysight 33210A Waveform/Function Generator.

The example of Gaussian spectral profiles of the filters 26, 32 has been given above, but it is entirely possible to use profiles of different shapes.

The fibre mirror 38 may be replaced with the Fresnel reflection of the cleaving of the output fibre of the optical switch 36: the cleaving angle determines the reflection coefficient but the latter is then limited to a maximum of 5%.

Figure 4A:
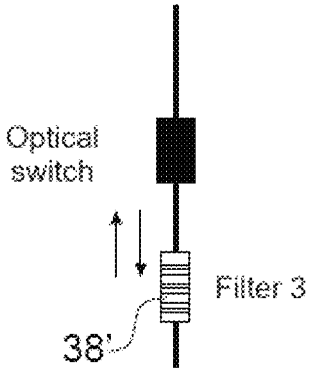
FIG. 4A
Figure 4B:
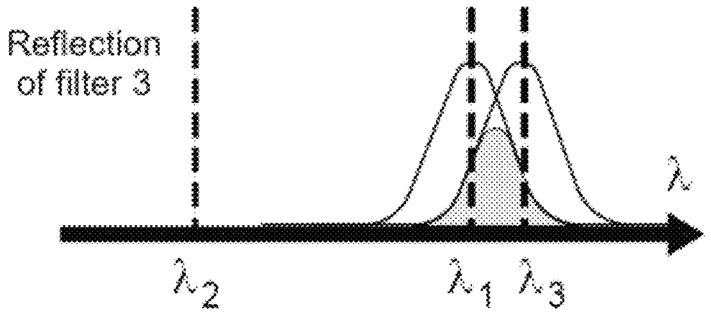
FIG. 4B illustrate a use of a fibre Bragg mirror instead of a fibre mirror.

As illustrated in FIG. 4A, the fibre mirror 38 may be replaced with a fibre Bragg mirror 38' (Filter 3) centred at a wavelength $\lambda_3$ (FIG. 4B): $\lambda_3$ is taken close to $\lambda_1$, the separation between $\lambda_3$ and $\lambda_1$ being smaller than the spectral widths of each of the filters 26, 38', such that there is spectral superposition of the filter 26 and of the filter 38', as illustrated in FIG. 4B. The CW lasing occurs at a wavelength defined by this spectral superposition, the power of the CW lasing being adjusted by the separation between the filters 26 and 38'.

Figure 5:
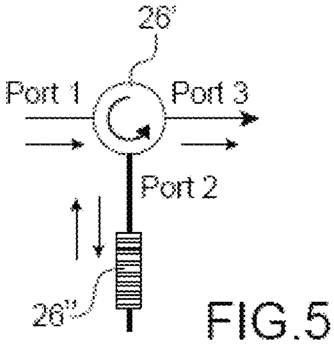
FIG. 5 illustrates a use of a reflection filter 1 instead of the first transmission filter.

As illustrated in FIG. 5, the transmission filter 26 may be replaced with an optical circulator 26' and a reflection filter 26".

Figure 6:
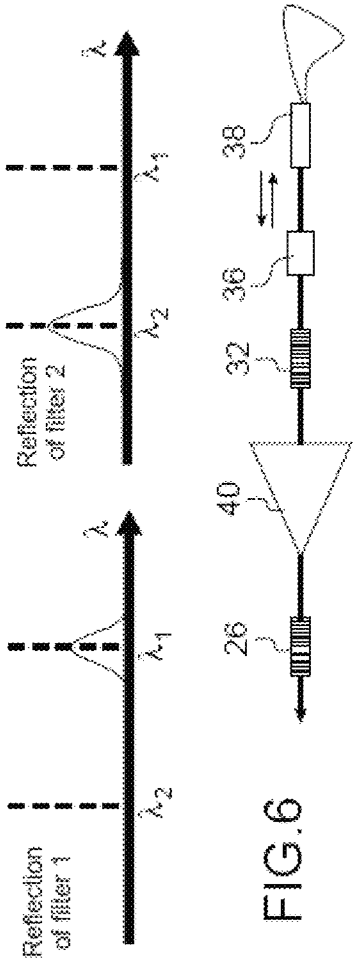
FIG. 6 is an example of device according to the invention using a linear cavity.

According to another embodiment, illustrated in FIG. 6, the cavity is only linear. In this case, a single amplifier 40, operating, in both directions, is used. The filter 26 (for example a fibre Bragg mirror of reflectivity less than 100%) is used both as a spectral filter and an output coupler.

In the examples presented, the system operates in the ytterbium spectral band (around 1 μm) but it may be adapted to other wavelength ranges (in particular the telecom 1.5 μm or mid-infrared 2-3 μm bands).

The invention makes it possible to produce a system that is simpler than the existing solutions, such as those implementing the injection of a short pulse from an external laser, or an additional arm including a saturable absorber. It makes it possible to obtain starting of the mode-locking with a large modulation depth (even if there is no spectral superposition between the filters) without a complex or expensive component such as a motorised tunable filter or a saturable absorber. In addition, there are no adjustable parameters, which gives the system a significant robustness.

Therefore, the invention proposes a simple solution to the problem of starting Mamyshev oscillators with large modulation depth (with non superposition of the filters).

The invention may be applied as a source of ultra-short pulses for a wide variety of applications such as spectroscopy, ablation of thin layers by laser, micro-machining/micro-cutting/micro-drilling/micro-marking, ophthalmic surgery, multiphotonic imaging, laser structuring and texturing, etc. The simple, compact, robust and inexpensive scheme proposed is entirely adapted to an implementation by a laser industrialist.

The invention claimed is:

1. A laser device, comprising:
- a first cavity forming a Mamyshev oscillator, comprising a bandpass first filter at a first wavelength, and a second filter that also transmits the wavelength but that is reflective at a second wavelength,
- a second cavity, containing the first cavity, for forming a continuous-wave laser beam at the first wavelength and/or at a third wavelength neighbouring the first wavelength, the separation between and the first and third wavelengths being smaller than a spectral width of the first filter and of the second filter, and
- means for allowing or interrupting a continuous-wave oscillation at the first wavelength or at the third wavelength neighbouring the first wavelength, in the second cavity.

2. The laser device according to claim 1, the separation between the first and second wavelengths and of the filters being between 5 nm and 25 nm.

3. The laser device of claim 2, the second cavity being delimited by a fiber mirror or by a fiber Bragg mirror.

4. The laser device according to claim 1, the second filter being disposed downstream of an optical circulator.

5. The laser device according to claim 1, the second cavity being delimited by a mirror, being a fiber mirror or by a fibre Bragg mirror.

6. The laser device according to claim 1, the means for allowing or interrupting the oscillation of the first wavelength, in the second cavity, comprising an optical switch or a variable optical attenuator.

7. The laser device according to claim 1, the second filter comprising a Bragg grating mirror.

8. The laser device according to claim 1, said first filter comprising a transmission filter or an optical circulator and a reflection filter.

9. The laser device according to claim 1, the first cavity being in a ring or being a linear cavity.

10. A method for starting the laser device according to claim 1, the method comprising:

generating, in the second cavity, a continuous-wave and multimode laser beam, at the first wavelength;

generating, in the first cavity, a pulsed laser beam at the second wavelength and at the first wavelength, and stopping the continuous-wave laser beam.

11. The method according to claim 10, wherein losses or gains at the first wavelength are modulated during a starting period.

12. The method according to claim 10, the first cavity comprising 2 fiber amplifiers each pumped by a laser diode, the method further comprising modulating the beam of the diodes.

* * * * *